United States Patent
Hirata et al.

(10) Patent No.: US 7,872,831 B2
(45) Date of Patent: Jan. 18, 2011

(54) THIN-FILM MAGNETIC HEAD HAVING A RECORDING HEAD PORTION CONFIGURED TO RECORD MAGNETIC INFORMATION ON A PATTERNED MEDIA, HEAD GIMBAL ASSEMBLY, AND HARD DISK SYSTEM

(75) Inventors: Kei Hirata, Tokyo (JP); Tetsuya Roppongi, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 886 days.

(21) Appl. No.: 11/756,134

(22) Filed: May 31, 2007

(65) Prior Publication Data

US 2007/0279803 A1   Dec. 6, 2007

(30) Foreign Application Priority Data

Jun. 2, 2006   (JP) .............................. 2006-154658

(51) Int. Cl.
*G11B 5/127* (2006.01)
(52) U.S. Cl. ............................. 360/125.21; 360/125.19
(58) Field of Classification Search .............. 360/125.2, 360/125.22, 125.25, 125.21, 125.07, 125, 360/125.09

See application file for complete search history.

(56) References Cited

U.S. PATENT DOCUMENTS

| 7,656,613 | B2 * | 2/2010 | Sasaki et al. ............. 360/125.2 |
| 2004/0240110 | A1 * | 12/2004 | Matono ...................... 360/126 |
| 2005/0041337 | A1 * | 2/2005 | Yazawa et al. .............. 360/126 |
| 2005/0068671 | A1 * | 3/2005 | Hsu et al. .................... 360/125 |
| 2005/0280938 | A1 * | 12/2005 | Sasaki et al. ................ 360/126 |

FOREIGN PATENT DOCUMENTS

| JP | 11-296845 | 10/1990 |
| JP | 2002-109712 | 4/2002 |
| JP | 2004-303302 | 10/2004 |
| JP | 2005-71429 | 3/2005 |
| JP | 2006-4604 | 1/2006 |

\* cited by examiner

*Primary Examiner*—Julie Anne Watko
(74) *Attorney, Agent, or Firm*—Oblon, Spivak, McClelland, Maier & Neustadt, L.L.P.

(57) ABSTRACT

The invention provides a thin-film magnetic head wherein the combined release angle Φ for a dominant recording magnetic field generated from a magnetic pole layer toward a patterned media for the purpose of recording magnetic information is set to within an angle range of 35° to 65° with respect to a patterned media surface. It is thus possible to invert, with efficiency and reliability, the directions of magnetization of isolate bits lined up on the patterned media for high-density recording.

8 Claims, 10 Drawing Sheets

FIG. 2
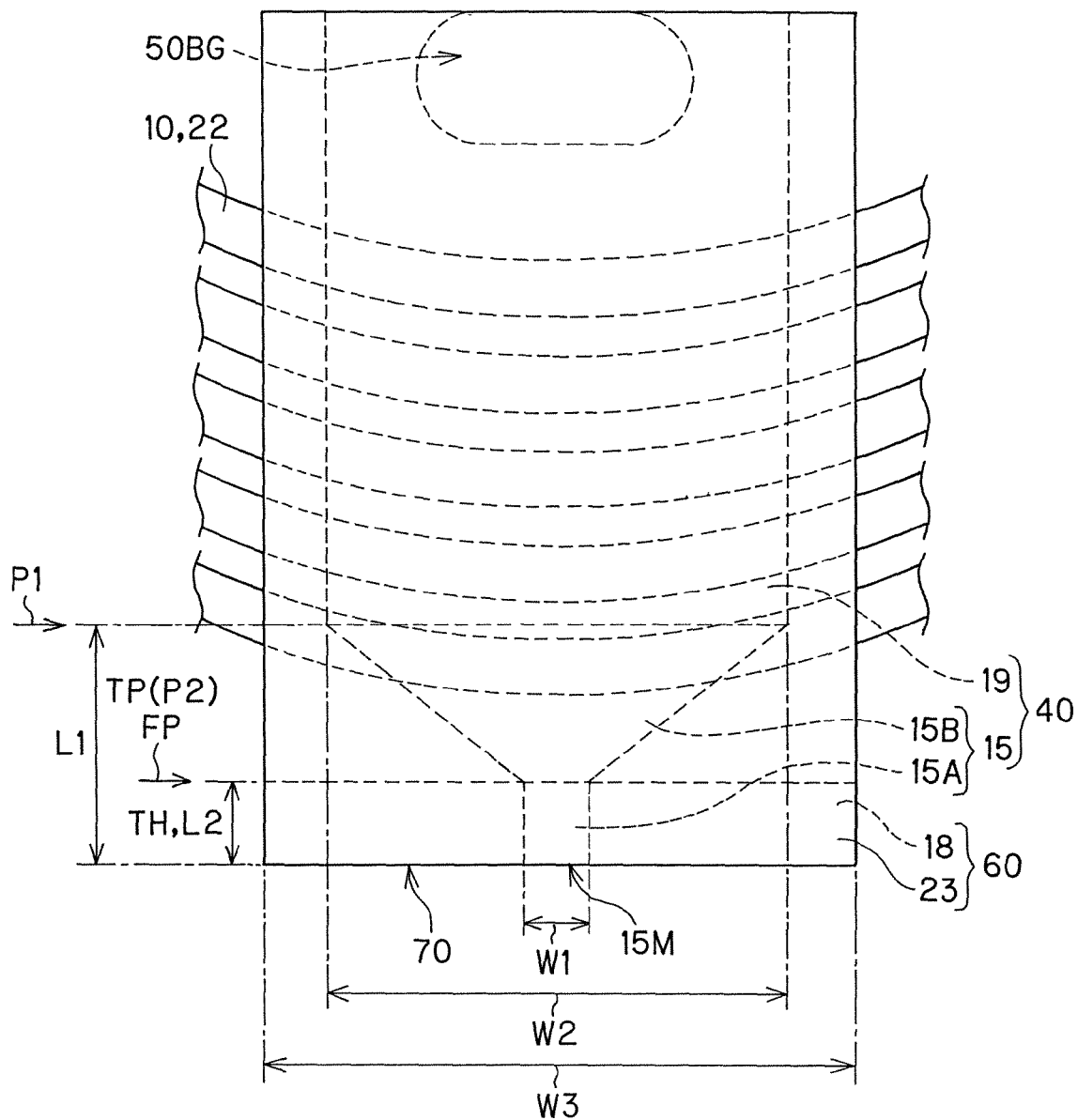
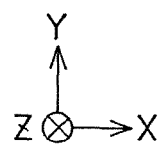

US 7,872,831 B2

THIN-FILM MAGNETIC HEAD HAVING A RECORDING HEAD PORTION CONFIGURED TO RECORD MAGNETIC INFORMATION ON A PATTERNED MEDIA, HEAD GIMBAL ASSEMBLY, AND HARD DISK SYSTEM

BACKGROUND OF THE INVENTION

1. Field of the Invention

The present invention relates to a thin-film magnetic head comprising a recording head portion adapted to record magnetic information on a patterned media having minimum magnetization inversion units lined up with a nonmagnetic area sandwiched between them.

2. Explanation of the Prior Art

Recent recording media are required to have large capacities so as to cope with multidata such as pictures, images, and sounds.

To meet such demands, current HDDs (hard disk drives) have ever higher plane recording densities: the recording bit size of magnetic recording media is as fine as about 10 nm. To obtain outputs from such fine recording bits, each bit must make sure as large saturation magnetization and film thickness as possible. As the recording bit grows fine, however, it causes a decrease in the volume of magnetization minimum unit (V) per bit, which may otherwise offer a problem that magnetized information vanishes off due to the inversion of magnetization by "thermal fluctuation".

Generally speaking, the smaller the value of $Ku \cdot V/kT$ (where Ku is an anisotropy constant, V is the volume of magnetization minimum unit, k is Voltzmann constant, and T is the absolute temperature), the larger the influence of that "thermal fluctuation" is, and experience has taught that as the value of $Ku \cdot V/kT$ is below 100, there is the inversion of magnetization occurring from the "thermal fluctuation". In other words, the energy of magnetic anisotropy necessary for keeping the direction of magnetization of magnetic particles constant is represented by the product of the energy density Ku of magnetic anisotropy and the volume V of a magnetic particle: as this value grows small, there is the "thermal fluctuation" phenomenon taking place at room temperature, which may otherwise let recorded magnetization go off.

A magnetic recording medium of the longitudinal magnetic recording mode is highly susceptible of the "thermal fluctuation" even at the time when magnetic particles still keep large particle diameters, because the demagnetization field within recording bits at an area having high recording density grows strong. A magnetic recording medium of the perpendicular magnetic recording mode, on the other hand, is less susceptible of the "thermal fluctuation", because if magnetic particles are allowed to grow in the thickness direction, the volume V of the magnetic field minimum unit can then be increased while the diameter of particles on the surface of the medium is kept small. With increasing recording density, however, resistance to thermal fluctuation will become insufficient even with the perpendicular magnetic recording mode.

As the media for solving such a thermal fluctuation resistance problem, attention is now directed to a magnetic recording medium called a patterned media. Generally, the patterned media is built up as a magnetic recording medium wherein multiple magnetic material areas each becoming a recording bit unit are independently formed in a nonmagnetic material layer. In a general patterned media, for instance, an oxide such as $SiO_2$, $Al_2O_3$ and $TiO_2$; a nitride such as $Si_3N_4$, AlN and TiN; a carbide such as TiC; and a boride such as BN is used as the material for the nonmagnetic layer, and the magnetic material areas each providing a recoding bit unit are selectively formed in the nonmagnetic material layer.

The patterned media, because of comprising a magnetic thin film divided to recording domain size, can have an increased volume V of the magnetization minimum unit, and get around the thermal fluctuation problem.

To achieve such a recording density as exceeding 1 Tbpsi, therefore, there must be the construction of the patterned media involved. And then, to achieve the recording density of 1 Tbpsi, the track width must be as narrow as possible. Still, the bit length must be as short as possible to increase the linear recording density, because the narrowness of the track width leads to a decrease in the recording magnetic field and a decrease in the fabrication yield. Typically, the track width and bit length should be about 50 to 70 nm and about 10 to 30 nm, respectively.

And now, for the purpose of making the thus set linear recording density of the patterned media effective and reliable and to make it much higher as well, of importance is upgrading the quality of recording (writing) bits, that is, the full inversion of magnetization of an associated bit (the inversion of the direction of magnetization of the bit): there is a demand for the proposal of the magnetic head best suited for recording on the patterned media. To put it another way, there is a demand for the development of a recording magnetic head that enables the direction of magnetization of physically isolated bits in the patterned media to be inverted efficiently, instantaneously, and reliably.

The situations being like this, the present invention has for its object the provision of a thin-film magnetic head comprising a recording head portion that enables the direction of magnetization of physically isolated bits in the patterned media to be inverted efficiently, instantaneously, and reliably.

SUMMARY OF THE INVENTION

According to the present invention, such an object is achieved by the provision of a thin-film magnetic head comprising a recording head portion adapted to record magnetic information on a patterned media comprising minimum magnetization inversion units lined up with a non-magnetic area sandwiched between them, characterized in that said recording head portion comprises a thin-film coil adapted to generate a magnetic flux, a magnetic pole layer that extends rearward from a patterned media opposite surface in opposition to said patterned media to generate a magnetic field for magnetizing said patterned media on the basis of the magnetic flux generated at said thin-film coil, and a write shield layer that is located on a side of said magnetic pole layer in a direction of travel of said patterned media and extends rearward from said patterned media opposite surface, so that said write shield layer is isolated by a gap layer from said magnetic pole layer on a side near said patterned media opposite surface and coupled to said magnetic layer through a back gap on a side far away from said patterned media opposite surface, wherein a combined release angle Φ for a dominant recording magnetic flux that is generated from said magnetic pole layer toward said patterned media for recording magnetic information is set to within an angle range of 35° to 65° with respect to said patterned media surface.

In a preferable embodiment of the thin-film magnetic head of the invention, the aforesaid combined release angle Φ for the dominant recording magnetic flux is set to within an angle range of 40° to 55° with respect to said patterned media surface.

In another preferable embodiment of the thin-film magnetic head of the invention, the aforesaid magnetic pole layer has a multilayer structure comprising a main magnetic pole layer that extends rearward from the patterned medium opposite surface in opposition to the patterned media and is adapted to generate a magnetic field for magnetizing said patterned media in a direction orthogonal to its surface on the basis of the magnetic flux generated at said thin-film coil, and an auxiliary magnetic pole layer that extends rearward from a first position receded from said patterned media opposite surface on said side in a direction of travel of said patterned media, wherein said main magnetic pole layer and said auxiliary magnetic pole layer are stacked one upon another, and wherein the dominant recording magnetic field for recording magnetic information is generated from the main magnetic pole layer positioned in front of said magnetic pole layer toward said patterned media.

In yet preferable another embodiment of the thin-film magnetic head of the invention, the aforesaid write shield layer comprises a first magnetic shield portion that extends along said gap layer from said patterned media opposite surface to a second position in front of said first position, and a second magnetic shield layer portion that extends from said patterned media opposite surface to at least said back gap while going partially over said first magnetic shield portion.

In a further preferable embodiment of the thin-film magnetic head of the invention, the aforesaid combined release angle Φ for the dominant recording magnetic field is adjusted by the adjustment of a length size of the first magnetic shield portion extending to said second position (a distance from an air bearing surface to the second position).

In a further preferable embodiment of the thin-film magnetic head of the invention, a projecting portion is formed on the leading side of said first magnetic shield portion to make a distance between said first magnetic shield portion and the magnetic pole layer shorter, and the aforesaid combined release angle Φ for the dominant recording magnetic field is adjusted by the adjustment of the depth of said projecting portion.

In a further preferable embodiment of the thin-film magnetic head of the invention, there is further a reproducing head adapted to reproduce the magnetic information recorded on said patterned media.

In a further preferable embodiment of the thin-film magnetic head of the invention, the aforesaid reproducing head comprises a magneto-resistive effect device as well as an upper read shield layer and a lower read shield layer located to shield said device magnetically from the surroundings, wherein said upper read shield layer and said lower read shield layer extend rearward from the patterned media opposite surface in opposition to the patterned media.

The invention also provides a head gimbal assembly, comprising a slider including the aforesaid thin-film magnetic head and located in such a way as to oppose to the patterned media, and a suspension adapted to resiliently support said slider.

Further, the invention provides a hard disk system, comprising a slider including the aforesaid thin-film magnetic head and located in such a way as to oppose to a rotationally driven disk form of patterned media, and a positioning device adapted to support and position said slider with respect to said patterned media.

In the thin-film magnetic head of the invention, the combined release angle Φ for the dominant recording magnetic field generated from the magnetic pole layer toward the patterned media for the purpose of recording magnetic information is set to within the angle range of 35° to 65° with respect to the patterned media surface. It is thus possible to efficiently, instantaneously and reliably invert the direction of magnetization of bits in the patterned media having physically isolated bits.

BRIEF EXPLANATION OF THE DRAWINGS

FIG. 2 is a plan view of the construction of part of the thin-film magnetic head (as viewed from the Z-axis direction);

DETAILED EXPLANATION OF THE INVENTION

The best mode for carrying out the invention is now explained in greater details.

Before the structure of the thin-film magnetic head of the invention is explained, an account is given of the patterned media that is the subject for magnetic recording in the invention.

[Explanation of the Construction of the Patterned Media (Having Recording Tracks) Wherein Minimum Magnetization Inversion Units are Lined Up with a Nonmagnetic Area Sandwiched Between Them]

Figure 10:
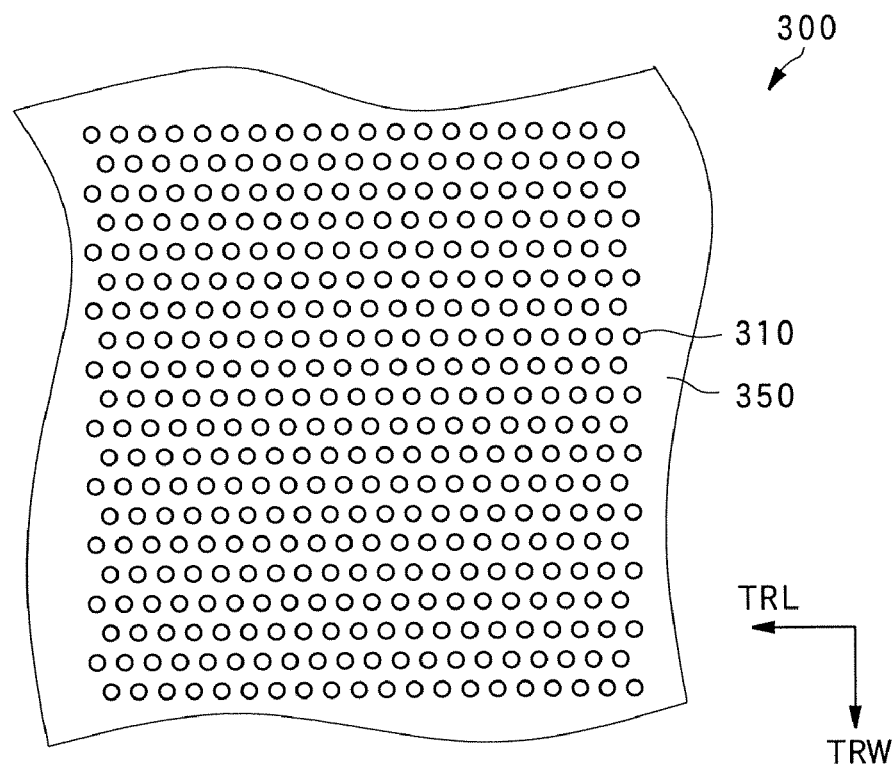
FIG. 10 is a plan view of one exemplary construction of the patterned media that is a magnetic recording medium.
Figure 11:
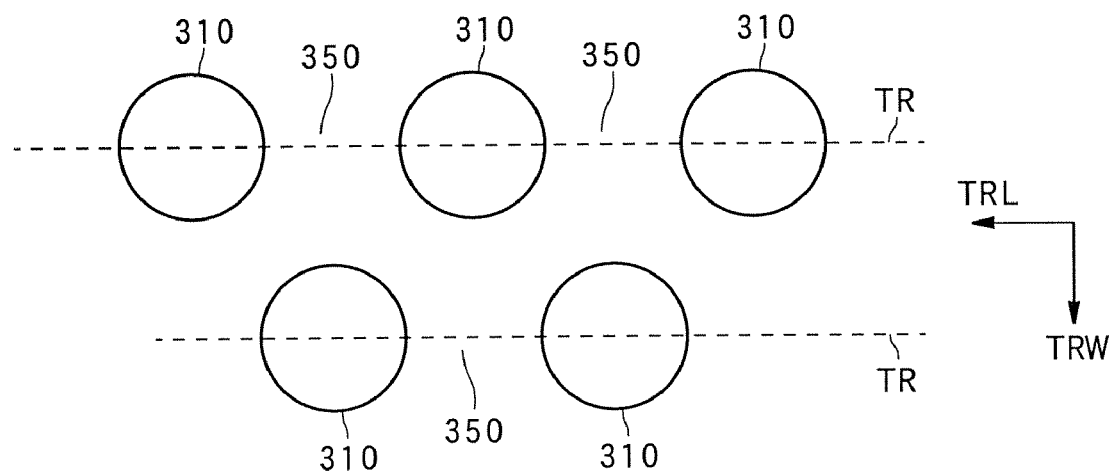
FIG. 11 is an enlarged view of FIG. 10.

FIGS. 10 and 11 are illustrative of one example of the construction of the patterned media that is a magnetic recording medium: FIG. 10 is a plan view of the recording plane and FIG. 11 is an enlarged view of FIG. 10.

As shown in FIGS. 11 and 10, in the patterned media 300, minimum magnetization inversion units 310, each a recording bit, are two-dimensionally lined up with a nonmagnetic area 350 sandwiched between them.

The recording tracks (TR) shown in FIGS. 10 and 11 are made up of the minimum magnetization inversion units 310 are lined up from left to right of each drawing, and the shown recording tracks lie parallel with one another.

The minimum magnetization inversion units 310 are lined up at equal intervals in the lengthwise direction of the recording tracks (indicated by an action arrow TRL) and in the widthwise direction of the recording tracks (indicated by an action arrow TRW). The lengthwise direction (indicated by the action arrow TRL) is the direction of travel of the head.

The position of the minimum magnetization inversion unit 310 located at a track adjacent to a specific track is determined substantially at center of the minimum magnetization inversion unit 310 adjacent to that specific track in the lengthwise direction of the recording tracks.

Figure 12:
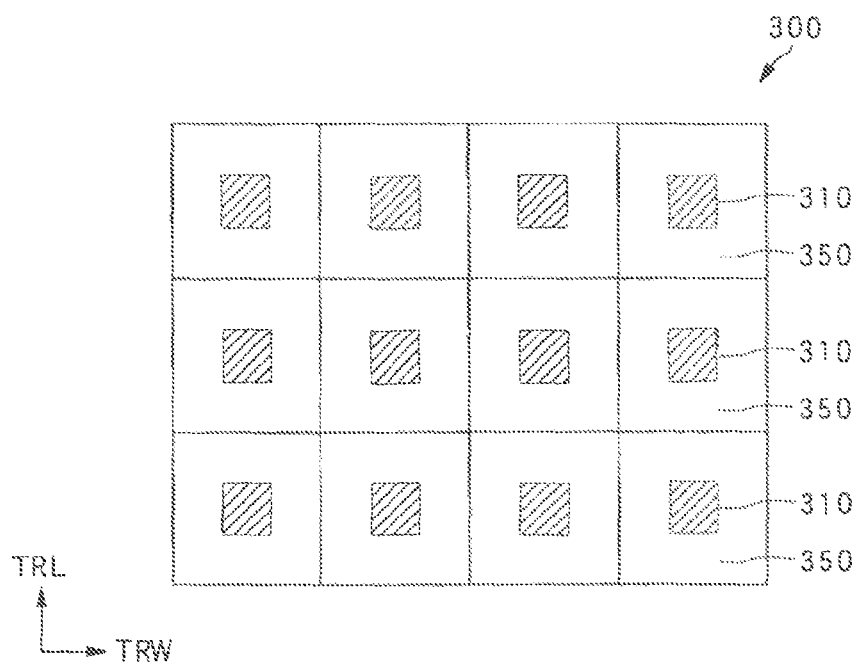
FIG. 12 is a plan view of another exemplary construction of the patterned media that is a magnetic recording medium.

FIG. 12 is illustrative of another example of the patterned media wherein the minimum magnetization inversion units 310 are positioned and lined up parallel in the widthwise direction of the recording tracks (indicated by the action arrow TRW), too.

Figure 13:
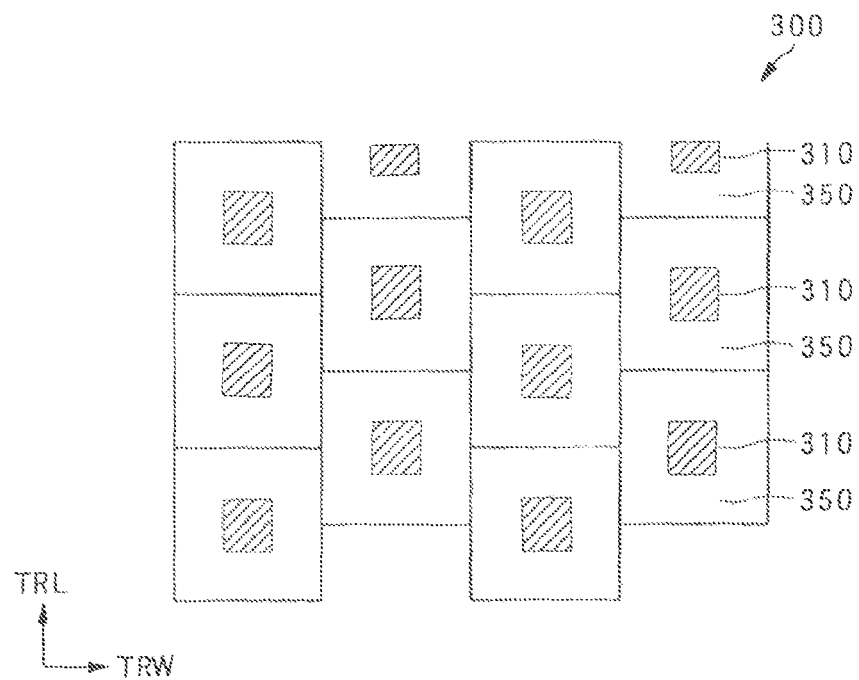
FIG. 13 is a plan view of yet another exemplary construction of the patterned media that is a magnetic recording medium.

FIG. 13 is illustrative of yet another example of the patterned media wherein the position of the minimum magnetization inversion unit 310 located at a track adjacent to a specific track is determined just halfway down the minimum magnetization inversion unit 310 adjacent to that specific track in the lengthwise direction of the recording tracks (indicated by the action arrow TRL).

Each minimum magnetization inversion unit 310 that is a recording bit is formed of a magnetic material area; for instance, it is formed of a magnetic material capable of perpendicular magnetic recording on the film plane. The depthwise lower portion of the magnetic material area taking aim at such perpendicular recording may be provided with a lining layer made of a soft magnetic material.

For the nonmagnetic material for the nonmagnetic area 350, for instance, use may be made of an oxide such as $SiO_2$, $Al_2O_3$ and $TiO_2$; a nitride such as $Si_3N_4$, AlN and TiN; a carbide such as TiC; and a boride such as BN.

It is here noted that the minimum magnetization inversion unit 310 that is a recording bit and the nonmagnetic area 350, for instance, are formed on a disk-form substrate, and the recording tracks provided by an array of minimum magnetization inversion units 310 are preferably formed on concentric circles. It is also noted that the minimum magnetization inversion unit 310 is by far smaller than disk size: its planar shape is not particularly limited, although its preferable shape, for instance, is a circular or rectangular shape as shown.

Such a patterned media may be fabricated by, for instance, two methods: (1) a magnetic material is filled in previously prepared mesopores (multipores) of about 2 to 50 nm, and (2) patterning is carried out after (or before) the formation of a magnetic film to form a given pattern. Specifically, the aforesaid method (1) involves block copolymer phase separation, guided self-assembly, Langmuir-Blodgett method, alumina anodic oxidization method, micelle method or the like, and the aforesaid method (2) involves optical lithography, electron beam lithography, X-ray lithography, interference lithography, nanoimprint or the like.

In this regard, synchronism with such a patterned media may be established by previously determining the plane density (track density) of each zone-sector in the media and then patterning the media. Patterning may be carried out by a physical method such as stamping or etching, or chemical method.

[Explanation of One Exemplary Construction of the Whole Thin-Film Magnetic Head]

One exemplary construction of the whole thin-film magnetic head according to the invention is now explained with reference to FIGS. 1, 2 and 3.

Figure 1:
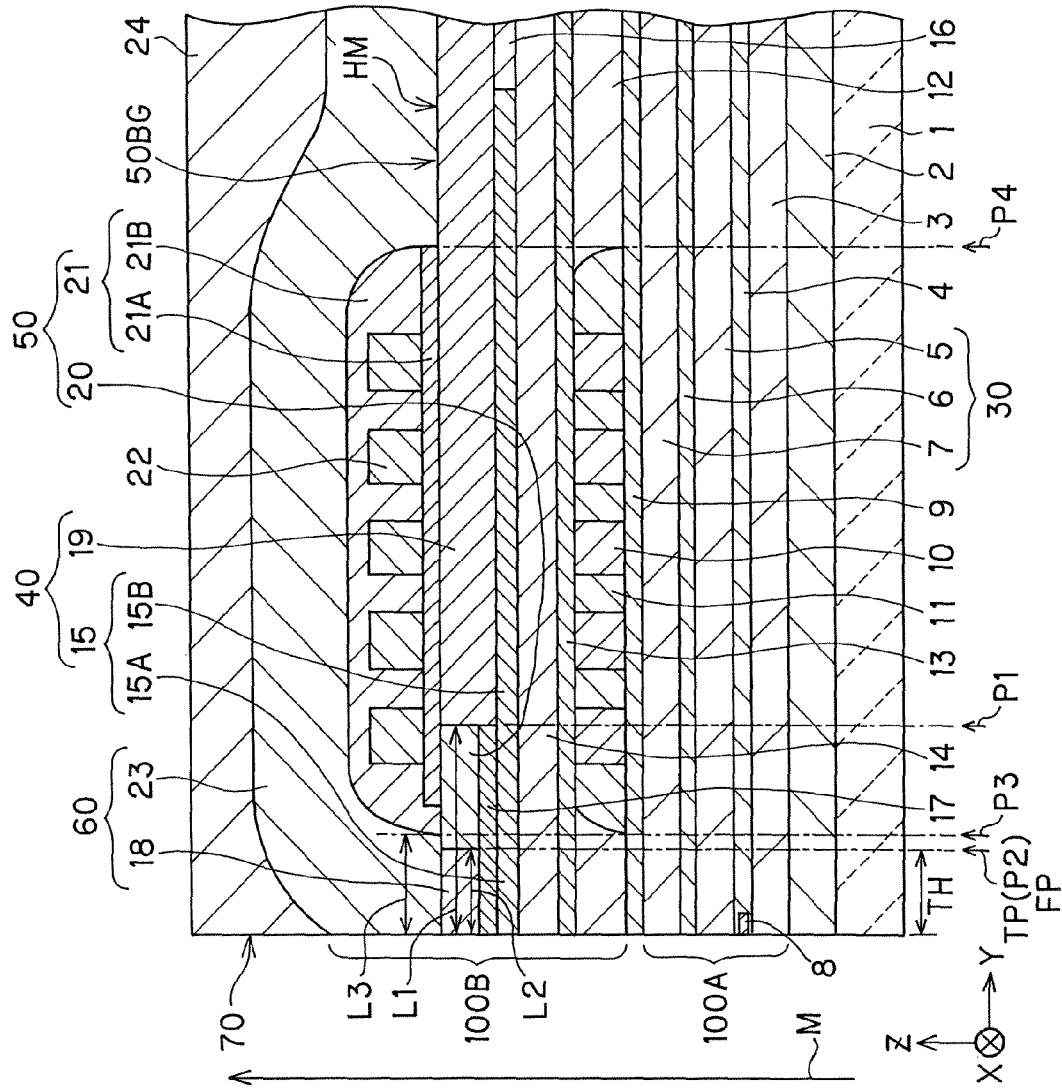
FIG. 1A is illustrative in section of the construction of the thin-film magnetic head parallel with the air bearing surface (as taken along the X-Z plane)
FIG. 1B is illustrative in section of the construction of the thin-film magnetic head perpendicular to the air bearing surface (as taken along the Y-Z plane)

FIG. 1 is illustrative in section of the construction of the whole thin-film magnetic head: FIG. 1(A) is illustrative in section of that construction parallel with the air bearing surface (as taken along the X-Z plane), and FIG. 1(B) is illustrative in section of that construction perpendicular to the air bearing surface (as taken along the Y-Z plane). FIG. 2 is a plan view of the construction of part of that magnetic head (as viewed from the Z-axis direction), and FIG. 3 is an enlarged plan view of the construction of an exposed surface of the magnetic pole portion (as viewed from the Y-axis direction). Note here that the upward action arrow M stands for the direction of relative movement of the recording medium (not shown) built up of the patterned media with respect to the thin-film magnetic head (medium travel direction).

Certain terminology may be used in the following description for convenience in reference only. For instance, the word "width" would refer to a dimension in the X-axis direction shown in FIGS. 1, 2 and 3, the "length" to a dimension in the Y-axis direction, and the "thickness" to a dimension in the Z-axis direction. Similarly, the word "front" would refer to a side nearer to the air bearing surface in the Y-axis direction, and the "rear" to the opposite side (a depth side).

The thin-film magnetic head is used on a magnetic recording system such as a hard disk drive for the purpose of applying magnetic processing to a recording medium moving in the medium travel direction M.

For instance, the thin-film magnetic head illustrated in the drawings is a composite type head capable of implementing both recording and reproducing as magnetic processing. The structure comprises, as shown in FIG. 1, a substrate 1 made of a ceramic material such as AlTiC ($Al_2O_3$.TiC), and an insulating layer 2 made of a nonmagnetic insulating material such as aluminum oxide ($Al_2O_3$; hereinafter referred simply as alumina), a reproducing head portion 100A adapted to reproduce magnetic information recorded by harnessing the magneto-resistive (MR) effect, a separation layer 9 made of a nonmagnetic insulating material such as alumina, a shield type recording head portion 100B adapted to implement a perpendicular recording mode of recording processing, and an overcoat layer 24 made of a nonmagnetic insulating material such as alumina, all stacked one upon another on the substrate 1 in that order.

For instance, the reproducing head portion 100A has a multilayer structure comprising a lower read shield layer 3, a shield gap film 4 and an upper read shield layer 30 stacked one upon another in that order. In the shield gap layer 4, there is a magneto-resistive effect device (MR device) 8 embedded as a reproducing device in such a way that its one end face is exposed on the recording medium opposite plane (air bearing surface) 70 in opposition to the recording medium.

Both the lower 3 and the upper read shield layer 30 are provided to separate the MR device magnetically from the surroundings, extending rearward from the air bearing surface 70. The lower read shield layer 3 is made of a soft magnetic material such as permalloy (Ni (80 wt %) Fe (20 wt %)) that is a nickel-iron alloy, and has a thickness of about 0.5 to 2.0 µm.

In the embodiment here, the upper read shield layer 30 has a structure in which a nonmagnetic layer 6 is sandwiched between two upper read shield portions 5 and 7. In other words, that upper read shield layer 30 has a structure where the upper read shield portion 5, the nonmagnetic layer 6 and the upper read shield portion 7 are stacked one upon another in order from a side near to a shield gap film 4.

The upper read shield portion 5 is made of a magnetic material such as permalloy, and has a thickness of typically about 0.5 to 2.0 µm. The upper read shield portion 7 is made of a magnetic material such as permalloy, too, and has a thickness of typically about 0.3 to 1.5 µm. The nonmagnetic layer 6 is made of a nonmagnetic material such as ruthenium (Ru) or alumina, and has a thickness of typically about 0.1 to 0.2 µm. While it is shown and described that the upper read shield layer 30 has a multilayer structure, it is contemplated that it is not always required to have a multilayer structure; it could have a single-layer structure as is the case with the lower read shield layer 3.

The shield gap film 4 is provided to separate the MR device 8 electrically from the surroundings; for instance, it is made of a nonmagnetic material such as alumina.

The MR device operates in such a way as to implement reproducing processing by making use of typically the giant magneto-resistive (GMR) effect, the TMR effect or the like.

The recording head portion 100B, for instance, has a multilayer structure comprising a first-stage thin-film coil 10 buried around with insulating layers 11, 12, 13, a nonmagnetic layer 14, a magnetic pole layer 40 partially buried around with an insulating layer 16, a gap layer 17, a second-stage thin-film coil 22 buried with an insulating layer 50 that forms a magnetic coupling opening (back gap 50BG) and a write shield layer 60, all stacked one upon another in order.

In FIG. 2, only a main part (thin-film coils 10, 22, magnetic pole layer 40 and write shield layer 60) extracted out of the recording head portion 100B is primarily shown.

The thin-film coil 10 has a primary function of generating a leakage-preventive magnetic flux for holding back leakage of a recording magnetic flux produced at the thin-film coil 22. This thin-film coil 10 is made of a highly electroconductive material such as copper, and has a thickness of typically about 2.0 µm.

As typically shown in FIGS. 1 and 2, the thin-film coil 10 in particular has a spiral structure having turns about the back gap 50BG. The thin-film coil 10 typically operates such that currents flow in a direction opposite to the direction taken by currents flowing through the thin-film coil 22. While it is shown in FIGS. 1 and 2 that the thin-film coil 10 has five turns by way of illustration alone, it is contemplated that the number of turns could optionally be varied. Preferably, the thin-film coil 10 should have as many turns as the thin-film coil 22, for instance, 2 to 7 turns. Note here that the thin-film coil 10 positioned at the lower portion of the drawings is not essential.

The insulating layers 11, 12, 13 are formed in such a way as to separate the thin-film coil 10 electrically from the surroundings. The insulating layer 11 is formed in such a way as to be filled up between the turns of the thin-film coil 10 and provide a cover around the thin-film coil 10. This insulating layer 11 is made of a non-magnetic insulating material such as a photoresist or spin-on-glass (SOG) exhibiting fluidity upon heating, and has a thickness of typically about 2.0 µm.

In the embodiment here, the insulating layer 11 is formed in such a way as to cover only the sides of the thin-film coil 10 but provide no cover to the upper side of the thin-film coil 10, as shown in FIG. 1.

The insulating layer 12 is formed in such a way as to provide a cover around the insulating layer 11. This insulating layer 12 is made of a nonmagnetic material such as alumina, and has a thickness of typically about 2.0 µm.

The insulating layer 13 is formed in such a way as to give a cover to the thin-film coil 10 as well as the insulating layers 11, 12. This insulating layer 13 is made of a nonmagnetic material such as alumina, and has a thickness of typically about 0.2 µm.

The nonmagnetic layer 14 is formed of a nonmagnetic insulating material such as alumina, or a nonmagnetic electroconductive material such as ruthenium, and has a thickness of typically about 1.0 µm.

The magnetic pole layer 40 has a primary function of implementing recording processing by receiving a magnetic recording magnetic flux produced at the thin-film coil 22 and releasing that magnetic flux toward the minimum magnetization inversion units (recording bit units) of the patterned media, thereby inverting the direction of magnetization of the minimum magnetization inversion units.

Such magnetic pole layer 40 is located on the leading side of the thin-film coil 22, extending rearward from the air bearing surface 70, more specifically, as far as the back gap 50BG. It is noted that when the state of movement of the patterned media that moves toward the patterned medium travel direction M shown in FIG. 1 is viewed as a sort of flow, the aforesaid "leading side" would refer to the incoming side (opposite to the patterned media travel direction M side) of that flow that is here corresponding to the upstream side in the thickness (Z-axis) direction. On the other hand, the outgoing side of the flow (the patterned media travel direction M side) would be called the "trailing side" that is here corresponding to the downstream side in the thickness direction.

In the embodiment here, the magnetic pole layer 40 has a structure where, as shown in FIG. 1, a main magnetic pole layer 15 and an auxiliary magnetic pole layer 19 are stacked one upon another in order and thereby coupled to each other. In other words, it has a multilayer (double-layer) structure where the main magnetic pole 15 is located on the leading side and the auxiliary magnetic pole layer 19 is located on the trailing side.

The main magnetic pole layer 15 functions as a portion for releasing off a main writing magnetic flux. This main magnetic pole layer 15 extends rearward from the air bearing surface 70 on the leading side, more specifically, as far as the back gap 50BG, and has a thickness of typically about 0.25 µm. Such main magnetic pole layer 15, for instance, is made of an iron alloy or the like. The iron alloy here, for instance, includes an iron-nickel alloy (FeNi), an iron-cobalt alloy (FeCo) or an iron-cobalt-nickel alloy (FeCoNi), all rich in iron (Fe).

It is noted that the aforesaid "coupled" would mean just only a coupling involving physical contact but also a coupling involving physical contact plus a magnetically conductive coupling.

As shown in FIG. 2, the main magnetic pole layer 15 is configured in a generally battledore type planar shape. To be more specific, the main magnetic pole layer 15 comprises, in order from the air bearing surface 70, a front end 15A that extends rearward from that air bearing surface 70 and having a constant width W1 for defining the recording track width of the recording medium and a rear end 15B that is linked to the rear of that front end 15A and having a width W2 greater than the width W1 (W2>W1). The position at which the width of the main magnetic pole layer 15 starts growing wide from the front end 15A (of width W1) toward the rear end 15B (of width W2) is a "flare point FP" that is one of important determinants for the recording performance of the thin-film head.

The front end 15A is primarily adapted to substantially release a recording magnetic flux produced at the thin-film coil 22 toward the patterned media, and has an exposed surface 15M exposed on the air bearing surface 70, as shown in FIG. 2. As shown typically in FIG. 3, the exposed surface 15M takes a planar shape defined by an upper end edge (one end edge) E1 positioned on the trailing side, a lower end edge (another end edge) E2 positioned on the leading side, and two side end edges E3. To be more specific, the exposed surface 15M typically assumes on a trapezoidal shape with its width becoming gradually narrow from the trailing side toward the leading side (W1>W4).

The trailing edge TE of the front end 15A provides a substantial recording site of the magnetic pole layer 40. Regarding the planar shape of the exposed surface 15M here, it is noted that the angle θ between the extending direction of the lower end edge E2 and the side end edges E3 could be set without restriction typically in the range of less than 90°.

The rear end 15B shown in FIG. 2 is adapted to receive the magnetic flux received in the auxiliary magnetic pole layer 19 and feed it to the front end 15A. Typically, the width of this rear end 15B remains constant (width W2) in the rear, and becomes gradually narrow from width W2 to width W1 in the front as the front end 15A comes near.

The auxiliary magnetic pole layer 19 functions as a portion adapted to receive a dominant magnetic flux. Typically, this auxiliary magnetic pole layer 19 extends rearward from a position P1 (the first position) receded from the air bearing surface 70. To be more specific, it extends as far as the rear of the main magnetic pole layer 15 at the back gap 50BG, and has a thickness of typically about 0.45 μm. Preferably, the auxiliary magnetic pole layer 19 is made of an iron-cobalt-nickel alloy. Note here that the auxiliary magnetic pole layer 19 may just as well be located on the lower portion of the main magnetic pole layer 15 (on the leading side).

As shown typically in FIG. 2, the auxiliary magnetic pole layer 19 has a rectangular planar shape of width W2. In the auxiliary magnetic pole layer 19 in particular, both an auxiliary insulating layer 20 of the insulating layer 50 to be described later and a TH defining layer 18 of the write shield layer 60 to be described later are flattened. That is, the end face of the auxiliary magnetic pole layer 19 on the trailing side forms a flat plane HM together with the end face of the auxiliary insulating layer 20 on the trailing side and the end face of the TH defining layer 18 on the trailing side.

The insulating layer 16 is provided to isolate the main magnetic pole layer 15 electrically from the surroundings. This insulating layer 16 is made of a nonmagnetic insulating material such as alumina, and has a thickness of typically about 0.25 μm.

The gap layer 17 is formed in such a way as to provide a gap for the magnetic separation of the magnetic layer 40 from the write shield layer 60. As typically shown in FIG. 1, the gap layer 17 extends rearward from the air bearing surface 70 along the main magnetic pole layer 15 except an area with the auxiliary magnetic pole layer 19 located on it. In particular, the gap layer 17 is made of a nonmagnetic insulating material such as alumina or a nonmagnetic electroconductive material such as ruthenium, and has a thickness of typically about 0.03 to 0.2 μm.

The insulating layer 50 defines the throat height TH that is one of important determinants for the recording performance of the thin-film magnetic head, and is adapted to cover the thin-film coil 22 in such a way as to isolate it electrically from the surroundings. As shown in FIGS. 1(A) and 1(B), the insulating layer 50 has a structure wherein an auxiliary insulating layer 20 (the first insulating layer portion) formed in such a way as to substantially define the throat height TH and a main insulating layer 21 (the second insulating layer portion) formed in such a way as to substantially cover the thin-film coil 22 are stacked one upon another in that order. It follows that there is a multilayer (double-layer) structure involved, wherein the auxiliary insulating layer 20 is located on the leading side and the main insulating layer 21 is located on the trailing side.

As shown in FIGS. 1(A) and 1(B), the auxiliary insulating layer 20 extends along the gap layer 17 and from a position receded from the air bearing surface 70, viz., a position P2 (the second position) between the air bearing surface 70 and a position P1 to the position P1 in the rear. And, the auxiliary insulating layer 20 is provided in such a way as to be adjacent to the auxiliary magnetic pole layer 19 at the position P1, and adjacent to the write shield layer 60 (the TH defining layer 18 to be described later) at the position P2. In the embodiment here in particular, the auxiliary insulating layer 20 defines a flat plane HM together with the auxiliary magnetic pole layer 19 and TH defining layer 18.

The aforesaid "position P2" is corresponding to the foremost end position of the insulating layer 50 (nearest to the air bearing surface 70). That is, there is a "zero throat height position TP" for defining the throat height TH. That throat height TH is a distance between the air bearing surface 70 and the zero throat height position TP. This auxiliary insulating layer 20 is made of a nonmagnetic insulating material such as alumina. In the embodiment shown in FIGS. 1 and 2, the zero throat height position TP is in coincidence with the flare point FP.

As shown in FIG. 1, the main insulating layer 21 extends rearward from a position P3 (the third position) between the positions P1 and P2 while lying along the flat plane HM of the auxiliary insulating layer 20. More specifically, the main insulating layer 21 extends in such a way as not to fill up the back gap 50BG, and is receded from the auxiliary insulating layer 20. As shown typically in FIG. 1, this main insulating layer 21 comprises a main insulating layer portion 21A that is located as an underlay of the thin-film coil 22 on the flat plane HM of the auxiliary insulating layer 20, and a main insulating layer portion 21B that is located in such a way as to cover the thin-film coil 22 and the main insulating layer portion 21A around it.

The main insulating layer portion 21A is made of a nonmagnetic material such as alumina, and has a thickness of typically about 0.2 μm.

The main insulating layer portion 21B is made of a nonmagnetic insulating material such as a photoresist or spin-on-glass (SOG) that exhibits fluidity upon heating. A portion of this main insulating layer portion 21B at and near its end edge is in such a rounded slant shape as to fall away toward that end edge.

The thin-film coil 22 is formed for the generation of a recording magnetic flux. For instance, the thin-film coil 22 operates such that currents flow in the direction opposite to the direction taken by currents through the aforesaid thin-film coil 10.

The write shield layer 60 works capturing the spreading component of a recording magnetic flux released off the magnetic pole layer 40, thereby holding back the spreading of that magnetic flux. Further, the structure of the write shield layer 60 provides one of effective means capable of controlling the combined release angle Φ for the main recording magnetic field that is generated from the magnetic pole layer 40—part of the invention as described later—toward the patterned media for the purpose of recording magnetic information.

Located on the trailing side of the main magnetic pole layer 40 and thin-film coil 22, the write shield layer 60 extends rearward from the air bearing surface 70, whereby it is spaced by the gap film 17 away from the magnetic pole layer 20 on its side near to the air bearing surface 70, and linked to the magnetic layer 40 through the back gap 50BG in its side far away from the air bearing surface 70.

The write shield layer 60 here comprises the TH defining layer 18 (the first magnetic shield layer portion) and a yoke layer 23 (the second magnetic shield layer portion) that are separate from each other, and has a structure wherein the TH defining layer 18 and yoke layer 23 are coupled to each other. It is here noted that the write shield layer 60 is not limited to the couple structure as shown; it may be an integral structure.

The TH defining layer 18 functions as a dominant magnetic flux inlet port adapted to capture an extra portion of the magnetic flux released directly from the magnetic pole, and has a function as well of controlling the combined release angle Φ for the main recording magnetic field that is generated from the magnetic pole layer 40 toward the patterned media for the purpose of recording magnetic information.

As shown typically in FIG. 1, this TH defining layer 18 extends from the air bearing surface 70 as far as a position in the rear, more specifically, as far as the position P2 in front of the position P1 while lying adjacent to the gap layer 17, so that at that position P2 it lies adjacent to the auxiliary insulating layer 20 of the insulating layer 50.

The TH defining layer 18 is made of a magnetic material having a high saturation flux density such as FeNi, FeCo and FeCoNi alloys, and assumes on a rectangular planar shape where W3>W2, preferably W3>W1, as shown in FIG. 2. In particular, the TH defining layer 18 forms the flat plane HM together with the auxiliary magnetic pole layer 19 and auxiliary insulating layer 20, as typically described above. In other words, the end face of the TH defining layer 18 on the trailing side forms the flat plane HM together with both the end face of the auxiliary magnetic pole layer 19 on the trailing side and the end face of the auxiliary insulating layer 20 on the trailing side. The TH defining layer 18 lies adjacent to the auxiliary insulating layer 20 at the position P2 as described above; that is, the TH defining layer 18 takes a substantial role of defining the foremost end position of the insulating layer 50 (the zero throat height position TH), thereby defining the throat height TH.

The yoke layer 23 is set up in such a way as to function as a passage for the magnetic flux captured out of the TH defining layer 18. As shown typically in FIG. 1, the yoke layer 23 goes over the TH defining layer 18, extending at least as far as the back gap 50BG from the air bearing surface 70 via on the insulating layer 50. In other words, in the front, there is the yoke layer 23 going over the TH defining layer 18 and linked to it, and in the rear, there is the yoke layer 23 lying adjacent to the magnetic pole layer 40 through the back gap 50BG and linked to it.

In the embodiment here, for instance, the yoke layer 23 extends as far as the rear of the back gap 50BG while linked to the main magnetic pole layer 40 at the back gap 50BG.

Such yoke layer 23, for instance, is made of a magnetic material similar to that of which the TH defining layer 18 is made, and takes a rectangular planar shape having a width W3 as shown in FIG. 2.

The distance of the main insulating layer 21 receded from the air bearing surface 70, viz., a distance L3 between the air bearing surface 70 and the position P3 is greater than the length of the TH defining layer 18, viz., a distance L2 between the air bearing surface 70 and the position P2 (L3>L2). In consideration of the structural relation where the distance L3 is greater than the distance L2, the write shield layer 60 is designed such that the length of a portion of the yoke layer 23 adjacent to the TH defining layer 18 (viz., the distance L3) is greater than the length of the TH defining layer (viz., the distance L2). In other words, when the magnetic flux is captured in the yoke layer 23 of the write shield layer 60 via the TH defining layer 18, the magnetic path taken by that magnetic flux flowing through the write shield layer 60 is incrementally expanded.

It is here noted that the thin-film magnetic head as described above may have a light source for so-called thermal assist recording purposes mounted on it. It is also noted that the thin-film magnetic head as described above may have shields mounted just only on the trailing side of the magnetic pole but on both its sides as well.

Figure 4:
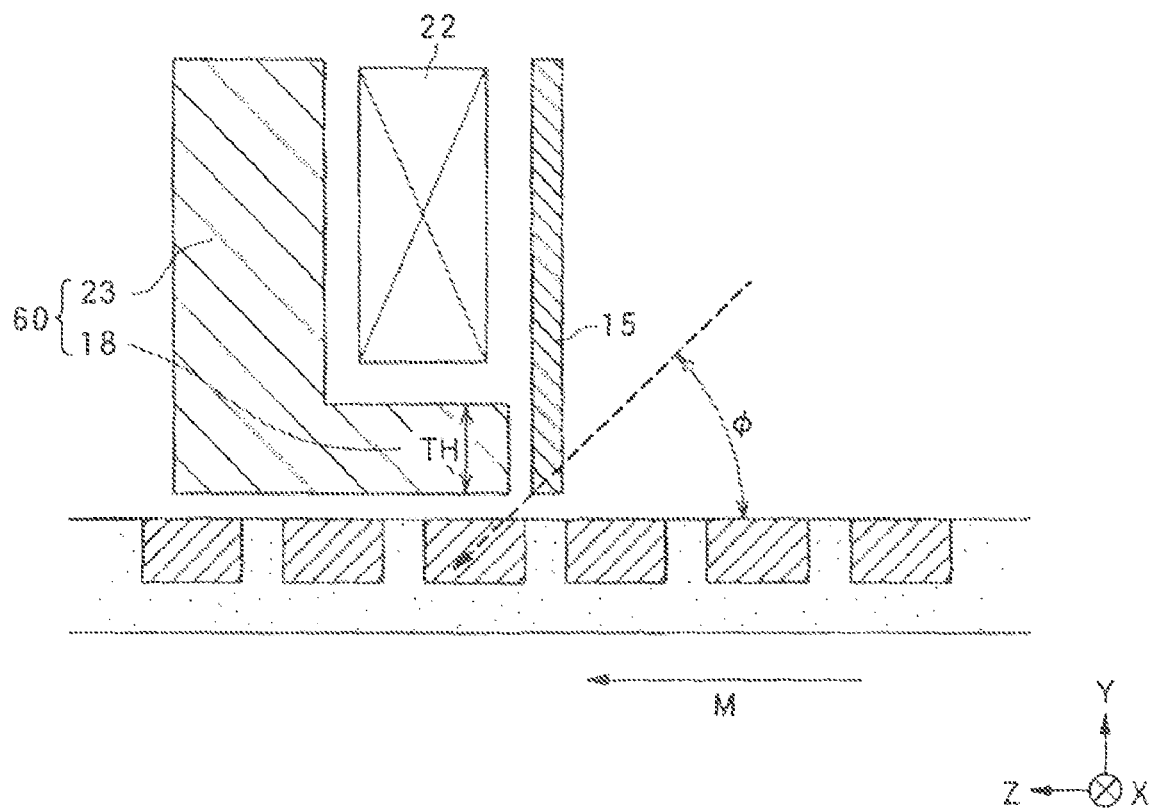
FIG. 4 is illustrative in schematic of position relations between the main magnetic pole layer adapted to substantially release a recording magnetic flux generated at the thin-film coil toward the patterned media, the write shield layer (especially the TH defining layer) adapted to capture a spreading component of the recording magnetic flux released out of the main magnetic pole layer, thereby holding back the spreading of that magnetic flux, and the patterned media.

Part of the invention to be specifically and structurally claimed by the invention in the preferable whole construction of the thin-film magnetic head as described above is now explained in further details with reference to FIG. 4.

Corresponding to FIG. 1(A), FIG. 4 is illustrative in schematic of position relations between the main magnetic pole layer 15 adapted to substantially release a recording magnetic flux generated at the thin-film coil 22 toward the patterned media, the write shield layer 60 (especially the TH defining layer 18) adapted to capture a spreading component of the recording magnetic flux released out of the main magnetic pole layer 15, thereby holding back the spreading of that magnetic flux, and the patterned media.

Figure 5:
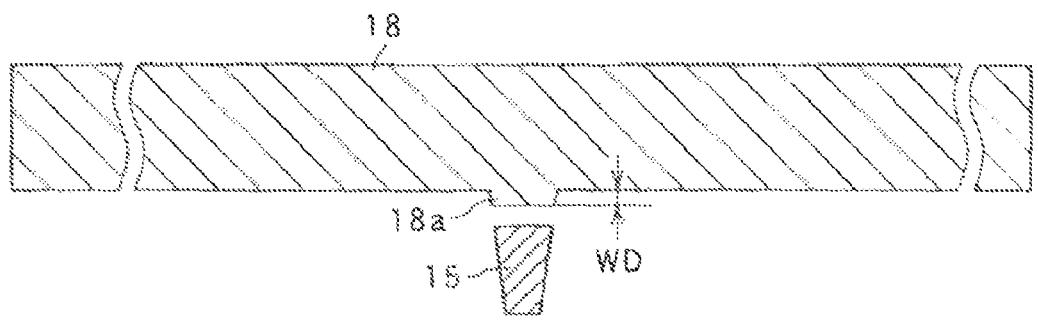
FIG. 5 is illustrative of the air bearing surface in opposition to the patterned media: it is illustrative in schematic of a modification to the main magnetic pole layer adapted to substantially release a recording magnetic flux generated at the thin-film coil toward the patterned media and the TH defining layer that forms the write shield layer.

Corresponding to FIG. 1(B), FIG. 5 is illustrative of the air bearing surface in opposition to the patterned media: it is specifically illustrative in schematic of a modification to the main magnetic pole layer 15 adapted to substantially release a recording magnetic flux generated at the thin-film coil toward the patterned media and the TH defining layer 18 that forms the write shield layer.

As shown in FIG. 4, the thin-film magnetic head of the invention is designed such that the combined release angle Φ for the dominant recording magnetic field that is generated from the main magnetic pole layer 15 toward the patterned media 40 for the purpose of recording magnetic information is set to within the angle range of 35° to 65°, preferably 40° to 55° with respect to the patterned media surface.

As that combined release angle Φ for the dominant recording magnetic field goes below 35°, it causes the inconvenience of being only imperfect inversion of magnetization of the minimum magnetization inversion units for the reason that the angle of access to the patterned media surface is too shallow for the saturation of magnetization of the minimum magnetization inversion units. In a word, there is only too insufficient recording or storage of magnetic information. As 65° is exceeded, on the other hand, it takes much time for the inversion of magnetization, so that faster switching operation—the object of the invention—is not achievable. The method of making the magnetization inversion speed (time) of the minimum magnetization inversion units much faster (shorter) by virtue of an oblique magnetic field in the aforesaid angle range of 35° to 65° is strictly based on the merit obtained through the use of the patterned media as a recording medium. In other words, even when it is attempted to record magnetic information on a medium in contrast to the patterned media, viz., a non-patterned magnetic recording film available in the form of an ordinary continuously formed film, in the aforesaid angle range of 35° to 65° for the combined release angle Φ for the dominant recording magnetic field, there is no way to overwrite. This is because for a continuous film having a structure different from that of the patterned media, the combined release angle for the dominant recording magnetic field must exceed 65°.

Here the exchange coupling of magnetic particles is elaborated on. In a continuous medium, there is an exchange coupling occurring between adjacent bits; however, in the patterned media in contrast to the continuous medium, there would be substantially no or little exchange coupling, because bits are physically isolated from one another. In case there is an exchange coupling, that coupling would be extremely weak. With the patterned media where a magnetic flux can penetrate from between patterns, therefore, there is switching more easily occurring than would be possible with a continuous medium having an increased exchange coupling.

The "combined release angle Φ for the dominant recording magnetic field" referred to in the present disclosure is defined as a combined magnetic field angle of a component in the perpendicular direction (tantamount to the Y direction in FIG. 1) and a component in the down track direction (tantamount to the Z direction in FIG. 1) at the maximum magnetic field intensity point occurring between the main magnetic pole 15 and the auxiliary magnetic pole 60. The maximum magnetic field intensity point may be found by measuring a magnetization gradient with currents passing through the coil, using a magnetic force microscope (MFM) or, alternatively, it may be mathematically estimated by the finite element method or from the solution of LLG (Landau-Lifshitzs-Gillbert) equation.

Such a combined release angle Φ for the dominant recording magnetic field may be adjusted by adjusting the thickness TH of the TH defining layer 18 that works capturing the spreading component of a recording magnetic flux released off the main magnetic pole layer 15, thereby holding back the spreading of that magnetic flux (FIG. 4). Alternatively, as shown in FIG. 5, a projecting portion 18a may be provided on the leading side of the TH defining layer 18 forming the write shield layer to make short the distance from the TH defining layer 18 to the magnetic pole layer 15: if the depth WD of that projection 18a is adjusted to vary the distance from the TH defining layer 18 to the magnetic pole layer, it is then possible to adjust the combined release angle Φ for the dominant recording magnetic field. For specific experimentation for the combined release angle Φ for the dominant recording magnetic field, see the experimental examples to be given later. Note here that the so-called effective gap length (the distance between the main magnetic pole and the write shield) is set at 0.2 μm or less. The distance of 0.2 μm is the maximum distance capable of inducing a magnetic flux from the main magnetic pole directly to the write shield.

[Explanation of the Head Gimbal Assembly and the Hard Disk System]

The head gimbal assembly and hard disk system according to the embodiment here are now explained.

A slider 210 included in the head gimbal assembly is first explained with reference to FIG. 6. In the hard disk system, the slider 210 is located in such a way as to face a hard disk that is a rotationally driven disk-form recording medium. This slider 210 primarily comprises a substrate 211 built up of the substrate 1 and overcoat 24 depicted in FIG. 1.

The substrate 211 is in a generally hexahedral shape. Of the six surfaces of the substrate 211, one surface (the upper surface in FIG. 6) is in opposition to the hard disk. On that one surface there is the air bearing surface 70 formed.

Figure 6:
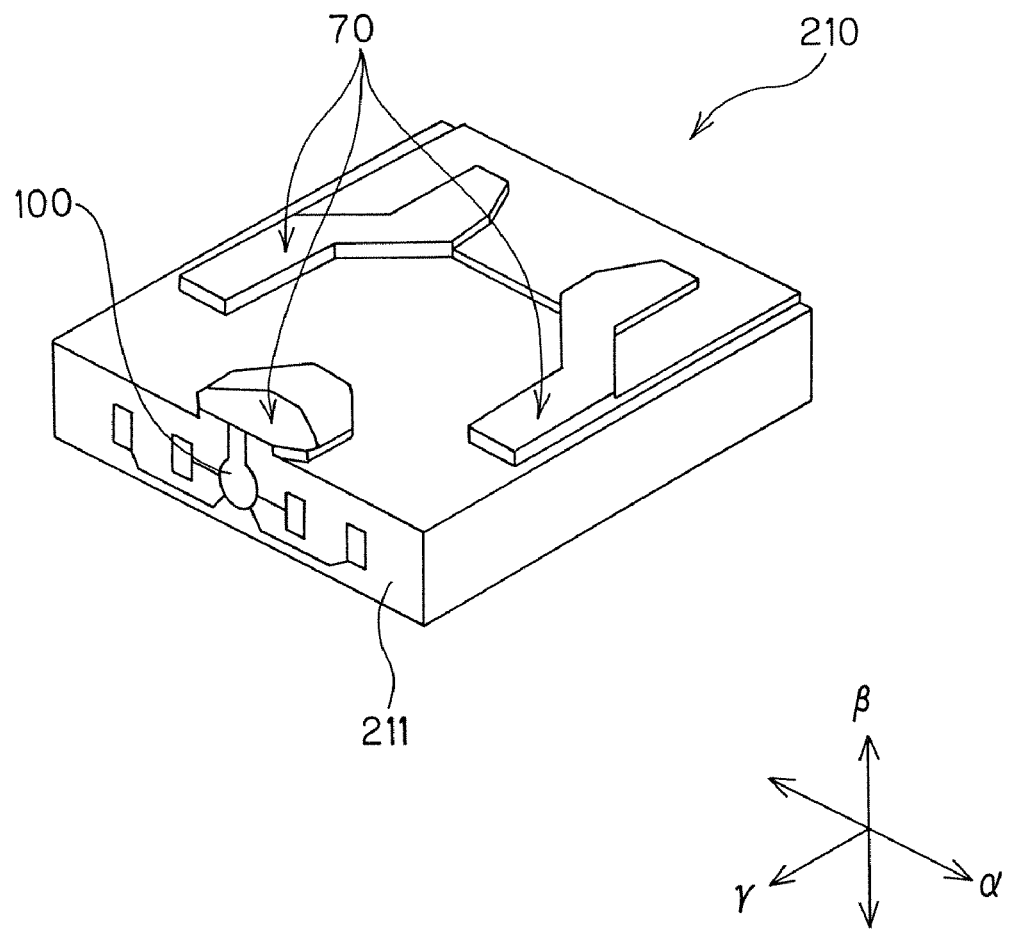
FIG. 6 is illustrative in perspective of the slider included in the head gimbal assembly according to one embodiment of the invention.

As the hard disk rotates in the γ direction in FIG. 6, it causes an air flow passing between the hard disk and the slider 210 to induce lift relative to the slider 210 in the downward β direction in FIG. 6. This lift in turn causes the slider 210 to levitate over the surface of the hard disk. Note here that the α direction in FIG. 6 traverses tracks on the hard disk.

Near the end of the slider 210 on an air exit side (the left lower end in FIG. 6), there is the thin-film magnetic head formed according to the embodiment here.

A head gimbal assembly 220 according to this embodiment is now explained with reference to FIG. 7. The head gimbal assembly 220 comprises a slider 210 and a suspension 221 adapted to resiliently support that slider 210. The suspension 221 comprises a leaf spring-form load beam 222 made of typically stainless steel, a flexure 223 attached to one end of the load beam 222 and having the slider 210 joined to it for giving a suitable degree of flexibility to the slider 210, and a base plate 224 attached to the other end of the load beam 222.

The base plate 224 is adapted to be attached to an arm 230 of an actuator for moving the slider 210 in the track traverse direction a of the hard disk 262. The actuator comprises the arm 230 and a voice coil motor for driving that arm 230. At a portion of the flexure 223 having the slider 210 attached to it, there is a gimbal portion provided for keeping the posture of the slider 210 constant.

The head gimbal assembly 220 is attached to the arm 230 of the actuator. The head gimbal assembly 220 attached to one arm 230 is called a head arm assembly, whereas the head gimbal assembly 220 attached to a carriage at its plurality of arms is referred to as a head stack assembly.

Figure 7:
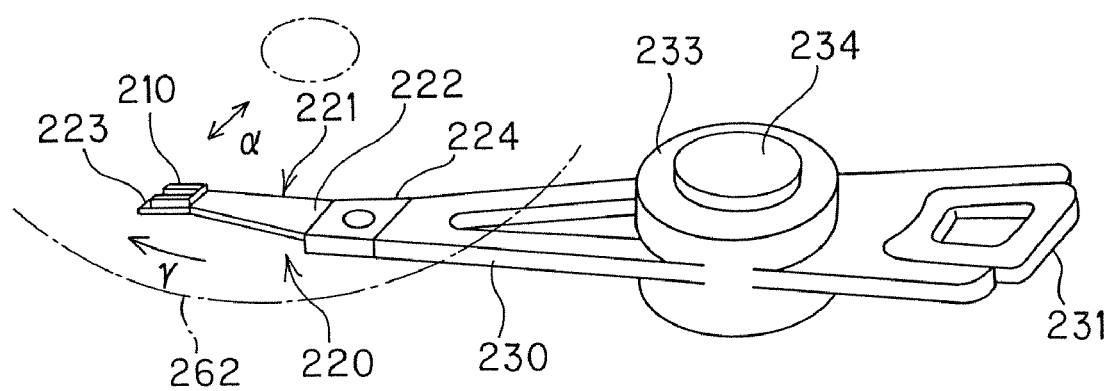
FIG. 7 is illustrative in perspective of the head arm assembly comprising the head gimbal assembly according to one embodiment of the invention.

FIG. 7 illustrates one example of the head arm assembly, wherein the head gimbal assembly 220 is attached to one end of the arm 230. To the other end of the arm 230, a coil 231 forming a part of the voice coil motor is attached. Halfway across the arm 230, there is a bearing portion 233 attached to a shaft 234 adapted to support the arm 230 in a pivotal fashion.

One each example of the head stack assembly and the hard disk system according to the embodiment here are now explained with reference to FIGS. 8 and 9.

Figure 8:
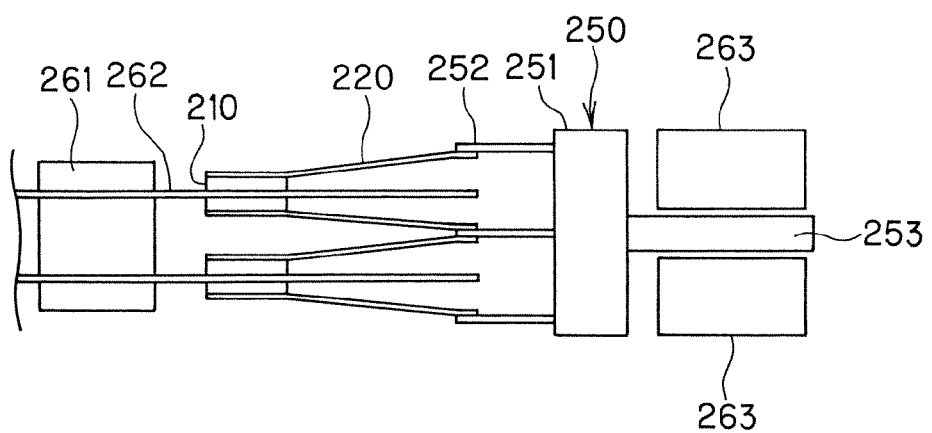
FIG. 8 is illustrative of part of the hard disk system according to one embodiment of the invention.
Figure 9:
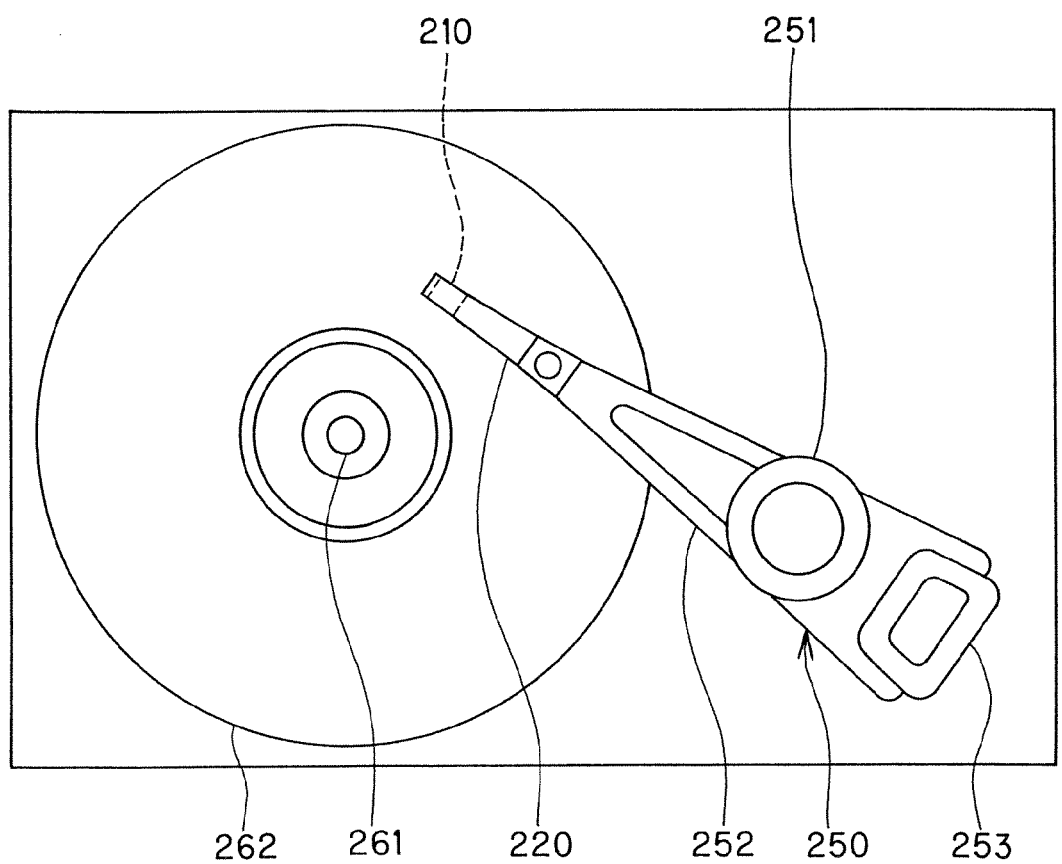
FIG. 9 is a plan view of the hard disk system according to one embodiment of the invention.

FIG. 8 is illustrative of part of the hard disk system, and FIG. 10 is a plan view of the hard disk system.

A head stack assembly 250 comprises a carriage 251 having a plurality of arms 252. The plurality of arms 252 are provided with a plurality of the head gimbal assemblies 220 such that they line up perpendicularly at an interval. On the side of the carriage 251 that faces away from the arms 252, there is a coil 253 attached, which coil becomes a part of the voice coil motor. The head stack assembly 250 is incorporated in the hard disk system.

The hard disk system comprises a plurality of hard disks 262 attached to a spindle motor 261. For each hard disk 262, two sliders 210 are located such that they are opposite to each other with the hard disk 262 held between them. The voice coil motor has also permanent magnets 263 located at opposite positions with the coil 253 of the head stack assembly 250 held between them.

The head stack assembly 250 except the slider 210 and the actuator correspond to the positioning device here which is operable to support the slider 210 and position it relative to the hard disk 262.

With the hard disk system here, the actuator is actuated to move the slider 210 in the track traverse direction of the hard disk 262, thereby positioning the slider 210 with respect to the hard disk 262. The thin-film magnetic head incorporated in the slider 210 works such that information is recorded by a recording head in the hard disk 262, and the information recorded in the hard disk 262 is played back by a reproducing head.

The head gimbal assembly and the magnetic disk system here have pretty much the same action as the thin-film magnetic head according to the foregoing embodiment.

While the embodiment here has been described with reference to the thin-film magnetic head of the structure wherein the reproducing head is located on the substrate side and the recording head is stacked on the reproducing head, it is contemplated that that order of stacking could be reversed. When the thin-film magnetic head here is used as a read-only head, the recording head could be removed from it.

The construction and advantages of the thin-film magnetic head according to the invention are now explained in greater details with reference to specific examples of experimentation.

Experimental Example 1

Figure 3:
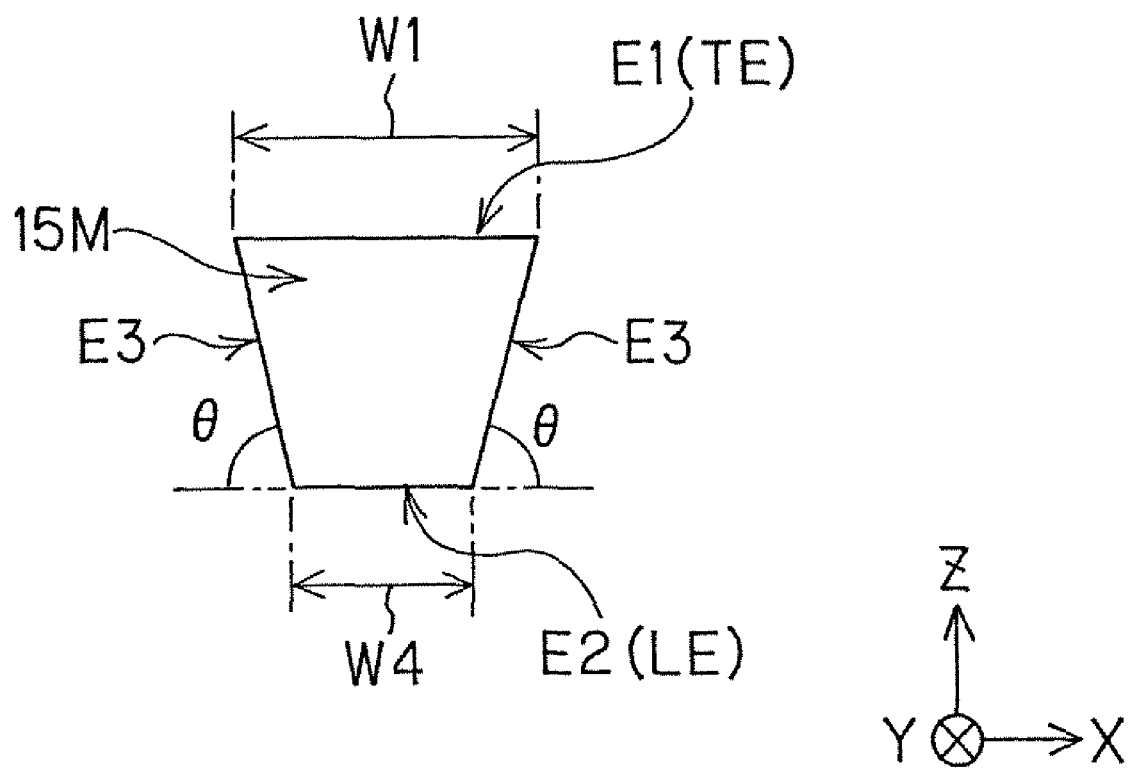
FIG. 3 is an enlarged plan view of the construction of a surface of the magnetic pole portion exposed on the air bearing surface (as viewed from the Y-axis direction)

The thin-film magnetic heads having such structure as shown in FIGS. 1, 2 and 3 were prepared.

There were various thin-film magnetic head samples prepared, wherein the write shield layer 60 was made of $CO_{65}Ni_{25}Fe_{15}$, the thickness TH of the TH defining layer 18 of the write shield layer 60 as shown in FIG. 4 was varied between 0 nm and 600 nm, and the combined release angle Φ for the dominant recording magnetic field was set at 90°, 72°, 63°, 54°, 45°, 40°, 36° and 27°.

Figure 14:
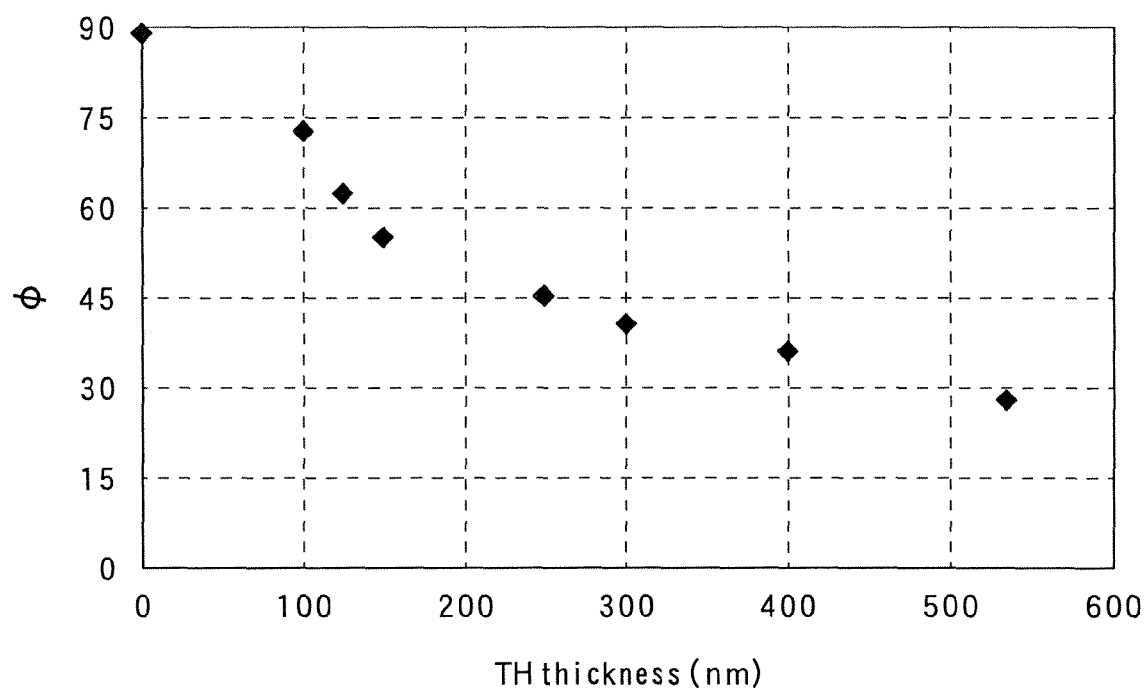
FIG. 14 is a graph indicative of relations between the thickness TH of the TH defining layer and the combined release angle Φ for the dominant recording magnetic field.

For reference purposes, FIG. 14 is a graph indicative of the relations between the thickness TH of the TH defining layer 18 and the combined release angle Φ for the dominant recording magnetic field found in the samples prepared in the experiments here. From the graph of FIG. 14, it is appreciated that the larger the thickness TH, the smaller the combined release angle Φ for the dominant recording magnetic field becomes.

Specifications of the Patterned Media for Recording

The patterned media used for experimental recording had the following specifications.

The track width, bit length and thickness were 60 nm, 60 nm and 30 nm, respectively. The material for the magnetic layer was FePt ($Al_2O_3$ matrix), with a coercive force of 8,000 Oe and a saturation magnetization of 700 emu/cc. The then soft magnetic under layer was CoZrTa of 100 nm in thickness.

For such a patterned media, the magnetization transition time (magnetization inversion time: switching time in arbitrary unit) for each dot was found on the thin-film magnetic heads whose combined release angle Φ for the dominant recording magnetic field was 90°, 72°, 65°, 55°, 45°, 40°, 35° and 27°, respectively. For the relative estimation of the respective data, the values of the data worked out by standardization with the arbitrary unit value of 90° as a reference are set out in the table.

The magnetization transition time for each bit was determined by measuring a time length from the start of inversion of magnetization of the bit after the release of the recording magnetic field to a point at which the magnetization of the bit reached a maximum in the inversion direction.

The results are shown in Table 1.

TABLE 1

| (A) | (B) | (C) |
|---|---|---|
| 90 | 395 | 1.000 |
| 72 | 390 | 0.987 |
| 65 | 370 | 0.937 |
| 55 | 365 | 0.924 |
| 45 | 360 | 0.911 |
| 40 | 357 | 0.904 |
| 35 | 355 | 0.899 |
| 27 | (State of imperfect inversion of magnetization) | — |

(A): Combined release angle Φ for the dominant recording magnetic field in deg.
(B): Magnetization transition time for each dot in arbitrary unit.
(C): Relative magnetization transition time for each dot (value standardized with the arbitrary unit value of 90 deg. as a reference.

Experimental Example II

There was experimentation carried out, wherein in each sample of TH=100 nm prepared in Experimental Example I, the specifications of the write shield layer were modified as shown in FIG. 5, the projecting portion 18a was formed on the leading side of the TH defining layer 18 forming the write shield layer for the purpose of making the distance between it and the magnetic pole layer 15 short, and the depth WD of that projecting portion was adjusted to adjust the combined release angle Φ for the dominant recording magnetic field.

Figure 15:
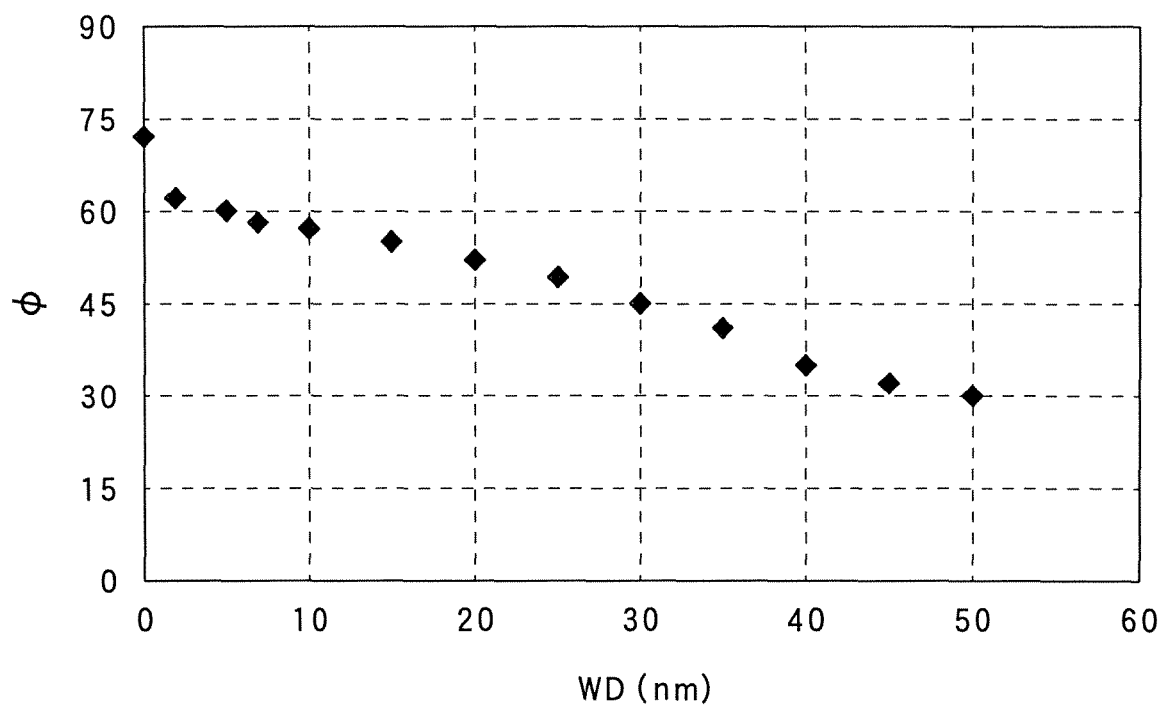
FIG. 15 is a graph indicative of relations between the depth WD of a projecting portion and the combined release angle Φ for the dominant recording magnetic field

The results are shown in the graph of FIG. 15.

As can be seen from the graph of FIG. 15, as the depth WD of the projecting portion is increased to make the distance between the write shield layer and the magnetic pole layer 15 shorter, there is a decrease in the combined release angle Φ for the dominant recording magnetic field.

Experimental Example III

There was comparative experimentation done as follows. This was to show that the effect of the invention of this application wherein the combined release angle for the dominant recording magnetic field was set at Φ=35° to 65° was quite unique to the patterned media having physically isolated bits. More specifically, experimentation for overwrite performance was done with a generally available continuous medium of the perpendicular magnetic recording mode.

The specifications of the continuous medium of the perpendicular magnetic recording mode were: a recording layer made of $CoCrPt.SiO_2$, a coercive force of 5,200 Oe, a saturation magnetization of 500 emu/cc, and a soft magnetic lining layer having a multilayer structure of CoZrTa (25 nm)/Ru (0.8 nm)/CoZrTa (25 nm).

In the magnetic heads used here, the respective combined release angles Φ for the dominant recording magnetic field were 90°, 72°, 65°, 58°, 55°, 50°, 45°, 40°, 35°, and 27°.

Overwrite performance was determined by recording LF (12 MHZ) on HF (90 MHz) and measuring the output ratio (dB) between the output of HF before recording and the rest of HF after LF recording.

For comparative consideration, overwrite performance was determined for the aforesaid patterned media too.

The results are set out in Table 2 give just below.

TABLE 2

| | Overwrite Value (–dB) | | |
|---|---|---|---|
| (A) | Continuous medium | Patterned Media | Difference (Δ) |
| 90 | 43.5 | 36.0 | –7.5 |
| 72 | 42.0 | 40.0 | –2 |
| 65 | 40.0 | 45.0 | 5 |
| 58 | 38.0 | 47.0 | 9 |
| 55 | 36.0 | 47.0 | 11 |
| 50 | 34.0 | 45.0 | 11 |
| 45 | 31.0 | 42.0 | 11 |
| 40 | 26.4 | 38.0 | 11.6 |
| 35 | 24.3 | 32.0 | 7.7 |
| 27 | 22.0 | 28.0 | 6 |

(A): Combined release angle Φ for the dominant recording magnetic field in deg.

From the results of Table 2, it can be appreciated that between the patterned media and the continuous medium, there are differences in the combined release angle Φ for the dominant recording magnetic field for achieving satisfactory overwrite values.

The advantages of the invention would be understood from the aforesaid results of experimentation. That is, in the invention, the combined release angle Φ for the dominant recording magnetic field generated from the magnetic pole layer toward the patterned media for the purpose of recording magnetic information is set to within the angle range of 35° to 65° with respect to the patterned media surface. It is thus possible to invert, with efficiency and reliability, the direction of magnetization of the bits of the patterned media having physically isolated bits. In addition, the setting of the combined release angle for the dominant recording magnetic field to Φ=35° to 65° is a quite unique requirement that is effective for the patterned media alone.

What we claim is:

1. A thin-film magnetic head comprising:
    a recording head portion configured to record magnetic information on a patterned media including minimum magnetization inversion units lined up with a non-magnetic area sandwiched between them, said recording head portion including,
    a thin-film coil configured to generate a magnetic flux,
    a magnetic pole layer that extends rearward from a patterned media opposite surface in opposition to said patterned media to generate a magnetic field to magnetize said patterned media on the basis of the magnetic flux generated at said thin-film coil, and
    a write shield layer that is located on a side of said magnetic pole layer in a direction of travel of said patterned media and extends rearward from said patterned media opposite surface, so that said write shield layer is isolated by a gap layer from said magnetic pole layer on a side near said patterned media opposite surface and coupled to said magnetic pole layer through a back gap on a side far away from said patterned media opposite surface,
    wherein a combined release angle Φ for a dominant recording magnetic field that is generated from said magnetic pole layer toward said patterned media for recording magnetic information is set to within an angle range of 35° to 65° with respect to said patterned media surface.

2. The thin-film magnetic head according to claim 1, wherein said combined release angle Φ for the dominant recording magnetic field is set to within an angle range of 40° to 55° with respect to said patterned media surface.

3. The thin-film magnetic head according to claim 1, wherein said magnetic pole layer has a multilayer structure comprising a main magnetic pole layer that extends rearward from the patterned medium opposite surface in opposition to the patterned media and is configured to generate a magnetic field for magnetizing said patterned media in a direction orthogonal to its surface on the basis of the magnetic flux generated at said thin-film coil, and an auxiliary magnetic pole layer that extends rearward from a first position receded from said patterned media opposite surface on said side in a direction of travel of said patterned media, wherein said main magnetic pole layer and said auxiliary magnetic pole layer are stacked one upon another,
    wherein the dominant recording magnetic field for recording magnetic information is generated from the main magnetic pole layer positioned in front of said magnetic pole layer toward said patterned media.

4. The thin-film magnetic head according to claim 1, wherein said write shield layer comprises a first magnetic shield portion that extends along said gap layer from said patterned media opposite surface to a second position in front of said first position, and a second magnetic shield layer portion that extends from said patterned media opposite surface to at least said back gap while going partially over said first magnetic shield portion.

5. The thin-film magnetic head according to claim 1, which further comprises a reproducing head configured to reproduce the magnetic information recorded on said patterned media.

6. The thin-film magnetic head according to claim 1, wherein said reproducing head includes a magneto-resistive effect device as well as an upper read shield layer and a lower read shield layer located to shield said device magnetically from surroundings,
    wherein said upper read shield layer and said lower read shield layer extend rearward from a patterned media opposite surface in opposition to the patterned media.

7. A head gimbal assembly, comprising:
    a slider including a thin-film magnetic head as recited in claim 1 and located in such a way as to oppose to the patterned media; and
    a suspension configured to resiliently support said slider.

8. A hard disk system, comprising:
    a slider including a thin-film magnetic head as recited in claim 1 and located in such a way as to oppose to a rotationally driven disk form of patterned media; and
    a positioning device configured to support said slider and position said slider with respect to said patterned media.

* * * * *